(12) United States Patent
Charafeddine et al.

(10) Patent No.: US 11,548,620 B2
(45) Date of Patent: Jan. 10, 2023

(54) ELECTROMECHANICALLY ACTUATED CONTROL ROD FOR FLIGHT VEHICLES

(71) Applicant: Parker-Hannifin Corporation, Cleveland, OH (US)

(72) Inventors: Abbas M. Charafeddine, Mission Viejo, CA (US); David E. Edwards, Rancho Santa Margarita, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 465 days.

(21) Appl. No.: 16/807,547

(22) Filed: Mar. 3, 2020

(65) Prior Publication Data

US 2020/0290729 A1 Sep. 17, 2020

Related U.S. Application Data

(60) Provisional application No. 62/816,353, filed on Mar. 11, 2019.

(51) Int. Cl.
*B64C 13/50* (2006.01)
*B64C 27/605* (2006.01)
(Continued)

(52) U.S. Cl.
CPC ............ *B64C 13/50* (2013.01); *B64C 13/16* (2013.01); *B64C 13/30* (2013.01); *B64C 27/605* (2013.01)

(58) Field of Classification Search
CPC ......... B64C 13/50; B64C 13/16; B64C 13/30; B64C 27/605; B64C 2027/7216;
(Continued)

(56) References Cited

U.S. PATENT DOCUMENTS 4,628,752 A * 12/1986 Paxton .................... F16D 59/00
 92/17
4,858,481 A * 8/1989 Abraham ............... H02K 11/25
 318/473
(Continued)

FOREIGN PATENT DOCUMENTS

CA         2983407 C  *  9/2019  ............. B64C 13/30
CN      103161905 A  *  6/2013  ............. B64C 13/28
(Continued)

*Primary Examiner* — Assres H Woldemaryam
(74) *Attorney, Agent, or Firm* — Renner, Otto, Boisselle & Sklar, LLP

(57) ABSTRACT

A control rod assembly is provided for moving a control surface of a flight vehicle. The control rod assembly includes a first connector for connecting to a first structure of vehicle, and a second connector for connecting to a second structure of the vehicle. A connecting rod may be operably coupled between the first and second connectors, and an actuator may be operably coupled to the connecting rod. The actuator may include a screw-and-nut assembly, and a motor that is configured to drive the screw-and-nut assembly. The actuator may be operable such that driving the screw-and-nut assembly via the motor causes the connecting rod to translate linearly along a longitudinal axis to thereby vary a distance between the first and second connectors. The actuators may be electromechanical actuators which may be controlled by a controller without pilot interaction. Two such actuators may be provided on opposite sides of the assembly.

19 Claims, 6 Drawing Sheets

(51) Int. Cl.
 B64C 13/16 (2006.01)
 B64C 13/30 (2006.01)
(58) Field of Classification Search
 CPC .......... B64C 2027/7255; B64C 13/503; B64C 27/72; F16H 25/2204; F16H 25/22; F16H 25/20; F16H 25/24; F16H 25/245; F16H 2025/2075; Y02T 50/30; Y02T 50/40
 See application file for complete search history.

(56) References Cited

U.S. PATENT DOCUMENTS

| | | | |
|---|---|---|---|
| 7,740,207 B2 | 6/2010 | Ferraz | |
| 7,837,143 B2 | 11/2010 | Matos | |
| 7,883,054 B2 * | 2/2011 | Elliott | F16H 25/205 74/89.23 |
| 8,508,168 B2 * | 8/2013 | Duits | F16H 25/2015 318/470 |
| 9,783,290 B2 * | 10/2017 | Covington | H01F 7/122 |
| 10,131,420 B2 | 11/2018 | Ataman | |
| 10,935,096 B2 * | 3/2021 | Adoline | F16F 15/03 |
| 2010/0084517 A1 * | 4/2010 | Benson | B64C 27/605 244/228 |
| 2010/0275710 A1 * | 11/2010 | Wingett | F16H 25/20 74/424.81 |
| 2014/0137680 A1 * | 5/2014 | Leglize | B60G 15/12 74/89.32 |
| 2017/0313409 A1 | 11/2017 | Edwards et al. | |
| 2018/0180144 A1 | 6/2018 | Legrand et al. | |
| 2018/0328397 A1 | 11/2018 | Hernandez | |
| 2019/0023378 A1 | 1/2019 | Miller et al. | |
| 2019/0063567 A1 * | 2/2019 | Gavriliuc | F16H 25/205 |
| 2020/0141354 A1 * | 5/2020 | Wu | B64C 15/02 |
| 2021/0190185 A1 * | 6/2021 | Mezzino | H02K 7/06 |

FOREIGN PATENT DOCUMENTS

| | | | | |
|---|---|---|---|---|
| CN | 104093630 A | * | 10/2014 | ............ B64C 13/18 |
| EP | 3254886 A1 | * | 12/2017 | ........... B60N 2/0232 |
| EP | 3275789 A1 | * | 1/2018 | ........... B64C 13/341 |
| EP | 3511244 A1 | * | 7/2019 | ............ B64C 25/18 |
| JP | 2004218720 A | * | 8/2004 | |

\* cited by examiner

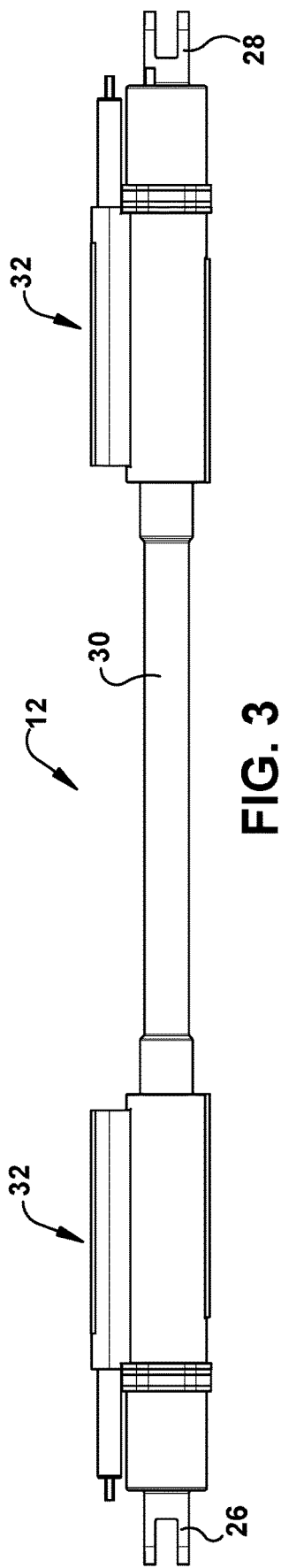
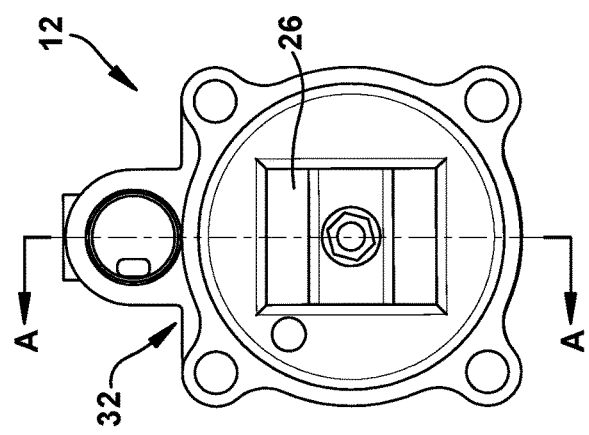
FIG. 3
FIG. 4

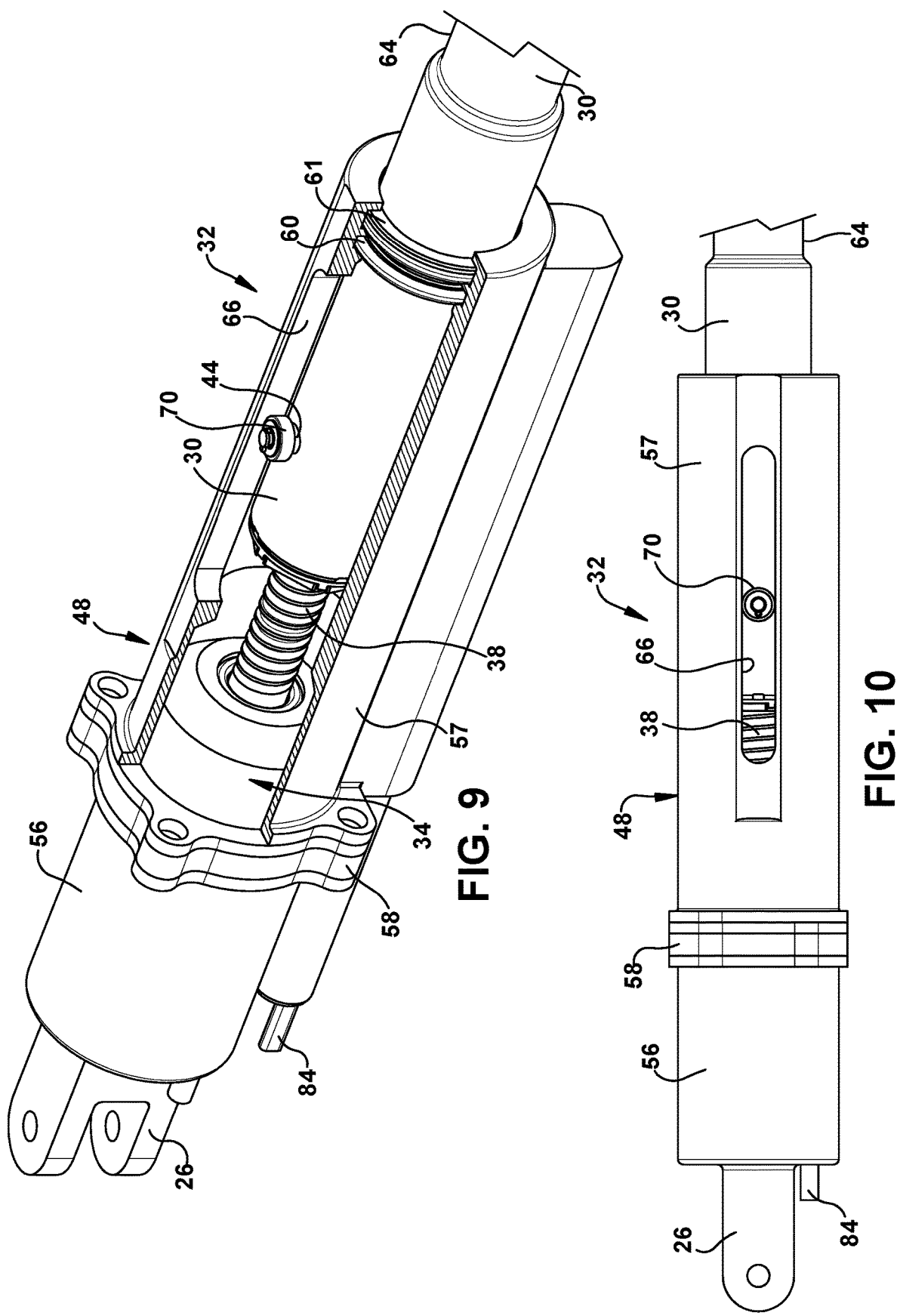

ELECTROMECHANICALLY ACTUATED CONTROL ROD FOR FLIGHT VEHICLES

RELATED APPLICATIONS

This application claims the benefit of U.S. Provisional Application No. 62/816,353 filed Mar. 11, 2019, which is hereby incorporated herein by reference in its entirety.

TECHNICAL FIELD

The present invention relates generally to flight vehicles, more particularly to a linkage used in the control of flight vehicles, and more particularly to an electromechanically actuated control rod assembly for moving control surface(s) of a flight vehicle.

BACKGROUND

Aircraft typically include a plurality of flight control surfaces that, when controllably positioned, guide movement of the aircraft through the air. The number and type of flight control surfaces included in an aircraft may vary, but typically both primary flight control surfaces and secondary flight control surfaces are included. The primary flight control surfaces are those that are used to control aircraft movement about the pitch, yaw and roll axes, and the secondary flight control surfaces are those that are used to influence the lift or drag (or both) of the aircraft.

Control rods are widely used in conventional (non-fly-by-wire) flight vehicles, such as fixed wing aircraft (e.g., airplanes) and rotating wing aircraft (e.g., helicopters), to move the control surfaces and guide movement of the flight vehicle. In conventional flight control systems, the control rod is a fixed length mechanical element that moves upon an action by the pilot.

For helicopters, in particular, the main rotor assembly typically includes a swash plate assembly having an upper swash plate and a lower swash plate through which the pilot communicates adjustments of the rotor blades via one or more control rods. The upper swash plate is connected to a rotor shaft which is rotated by the helicopter engine, thereby causing rotation of the upper swash plate and the rotor blades via a hub. Pitch control rods from the upper swash plate are coupled to the rotor blades to transfer movements of the upper swash plate to the blades. The lower swash plate is fixed in position, and ball bearings are interposed between the upper and lower swash plates to allow the upper swash plate to spin freely on top of the lower swash plate. Control rods attached to the lower swash plate connect to cyclic- and collective-pitch levers. When the pilot operates these levers, the pilot's inputs are transmitted via the control rods to the lower swash plate and then to the upper swash plate, thereby enabling the pilot to manipulate the swash plate assembly and control the helicopter's motion.

SUMMARY

Presently, thousands of flight vehicles are in-service, which are constantly being modernized and automated to reduce reliance on pilot action.

A smart control rod assembly is disclosed herein which can be controlled by flight control computers instead of pilot action and/or which may be used to augment pilot action.

More particularly, an exemplary control rod assembly includes one or more actuators that, when actuated, varies the connector-to-connector length of the control rod assembly as desired (e.g., extending or retracting) thereby mimicking the pilot action.

The exemplary control rod assembly may be interchangeable with conventional fixed length mechanical control rods on flight vehicles. For example, the exemplary control rod assembly may be designed with irreversible functionality, thereby fulfilling requirements of conventional designs.

The exemplary control rod assembly may include an actuator on each end of the assembly that enables the change in connector-to-connector length. The control rod assembly may be configured to operate in active/active mode (e.g., such that both actuators are operated together to achieve the change in length), or in active/standby mode (e.g., one actuator is operated while the other is in standby mode).

The actuator of the exemplary control rod assembly may be an electromechanical actuator that includes a motor and a power screw (e.g., ball screw, ACME screw, or roller screw). The power screw may be rotating or translating depending on the design requirements. The exemplary control rod assembly also may include a brake and/or a position sensor. Each actuator may be commanded and monitored by a dedicated motor control unit channel. The control unit electronics can be packaged within the control rod assembly, or remotely mounted away from the control rod assembly and connected to the actuator via an electric wiring harness, for example.

Helicopters, in particular, create a high-vibration environment in which relatively low loads are exerted on the control rods, and in which the control rods typically require precise axial movement. The exemplary control rod assembly disclosed herein may include at least one inline direct drive motor that drives a screw and nut assembly to vary the linear connect-to-connector length of the control rod assembly. The direct drive motor may be a rotary electric motor, and the screw and nut assembly may include a ball screw and nut assembly in which the ballscrew may be drivingly rotated by the direct drive motor, and the ballnut may translate linearly to change the connect-to-connector distance. The use of the direct drive motor may minimize the envelope and weight of the actuator for the control rod assembly, which may be particularly beneficial for minimizing inertia and/or induced vibration in high-vibration environments, such as experienced with helicopter. The exemplary control rod assembly may include two electric direct drive motors symmetrically placed on opposite ends of the assembly to reduce the effect of their mass due to induced vibration. The use of the ballscrew and ballnut assembly may provide improved precision and accuracy, and may reduce friction and wear.

The control rod assembly may provide irreversibility with electric motor zero velocity hold monitoring, and in the event of electrical failure, by motor cogging (magnetic detents) and/or a failsafe brake. The actuator components may be contained within a sealed housing, thereby limiting their exposure to the external environment.

Generally, a smart control rod assembly is disclosed herein that offers a compact, lightweight, environmentally sealed, symmetrically packaged, low axial play, stiff, irreversible, and/or low maintenance design solution for flight vehicles.

According to an aspect of the present disclosure, a control rod assembly for moving a control surface of a flight vehicle includes: a first connector for connecting to a first structure of the flight vehicle; a second connector for connecting to a second structure of the flight vehicle; a connecting rod operably coupled between the first and second connectors; and an actuator operably coupled to the connecting rod, the actuator including a screw-and-nut assembly mounted with respect to the connecting rod, and a motor that is configured to drive the screw-and-nut assembly; wherein the actuator is operable such that driving the screw-and-nut assembly via the motor causes the connecting rod to translate linearly along a longitudinal axis to thereby vary a distance between the first and second connectors.

According to another aspect of the present disclosure, a control rod assembly includes: a connecting rod, a first end portion having a first actuator that is operably coupled to the connecting rod and operative to extend, retract, or hold a first portion of the connecting rod relative to the first actuator, a second end portion opposite the first end portion having a second actuator that is operably coupled to the connecting rod and operative to extend, retract, or hold a second portion of the connecting rod relative to the second actuator.

According to another aspect of the present disclosure, a helicopter rotor assembly includes: a plurality of rotor blades having respective control surfaces; a swashplate assembly operably coupled to the plurality of blades; a control rod assembly operably coupled to the swashplate assembly to effect movement of the control surfaces; wherein the control rod assembly includes: a first connector operably coupled to the swashplate, and second connector operably coupled to another structure of the helicopter; a connecting rod operably coupled between the first and second connectors; and an actuator operably coupled to the connecting rod, the actuator being configured to adjust a position of the connecting rod to vary a distance between the first and second connectors.

According to another aspect of the present disclosure, a flight vehicle control system of a flight vehicle having a control surface includes: an electronic flight controller; and the control rod assembly according to any of the foregoing that is operably coupled to the flight controller; wherein the control rod assembly is operable to move the control surface of the flight vehicle independently of human pilot interaction.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 3 is a side view of the control rod assembly.
FIG. 4 is an end view of the control rod assembly.

FIG. 9 is a perspective quarter section view of a portion of the actuator of the control rod assembly, which is shown in a partially-extended/partially-retracted (intermediate) state.

FIG. 10 is a bottom view of the actuator of the control rod assembly, which is shown with a cover plate removed and in the partially-extended/partially-retracted (intermediate) state.

DETAILED DESCRIPTION

The principles and aspects according to the present invention have particular application to control rod assemblies such as for use in moving control surfaces of helicopters, and thus will be described below chiefly in this context. It is understood, however, that principles and aspects according to the present invention may be applicable to other systems or flight vehicles, such as airplanes or other aircraft, for controlling the movement of other components or control surfaces, such as elevators, ailerons, rudders, stabilizers, flaps, slats, spoilers, or the like.

Figure 1:
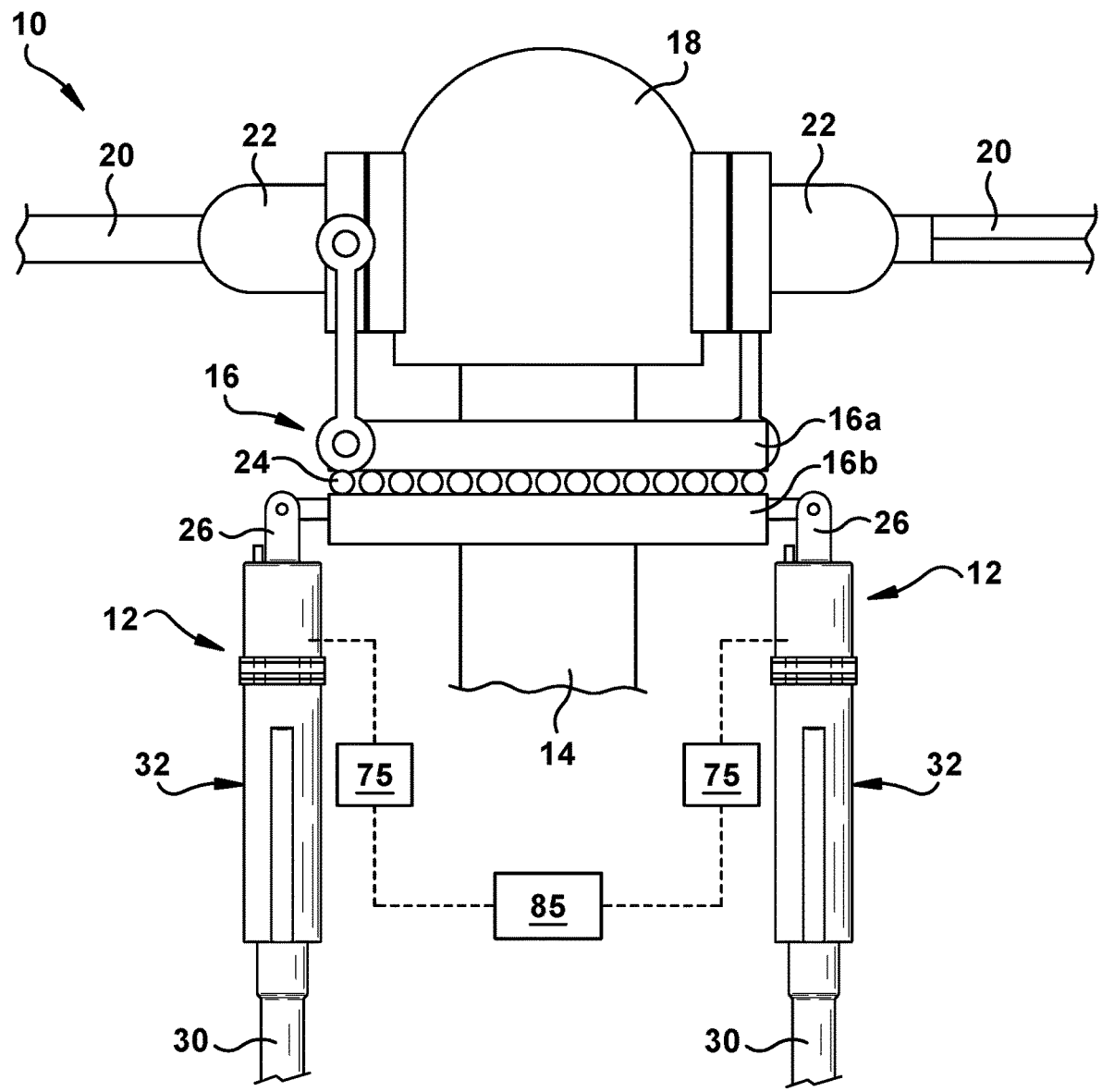
FIG. 1 is a partial side view of a helicopter rotor assembly, including an exemplary control rod assembly according to an embodiment of the present disclosure.
Figure 2:
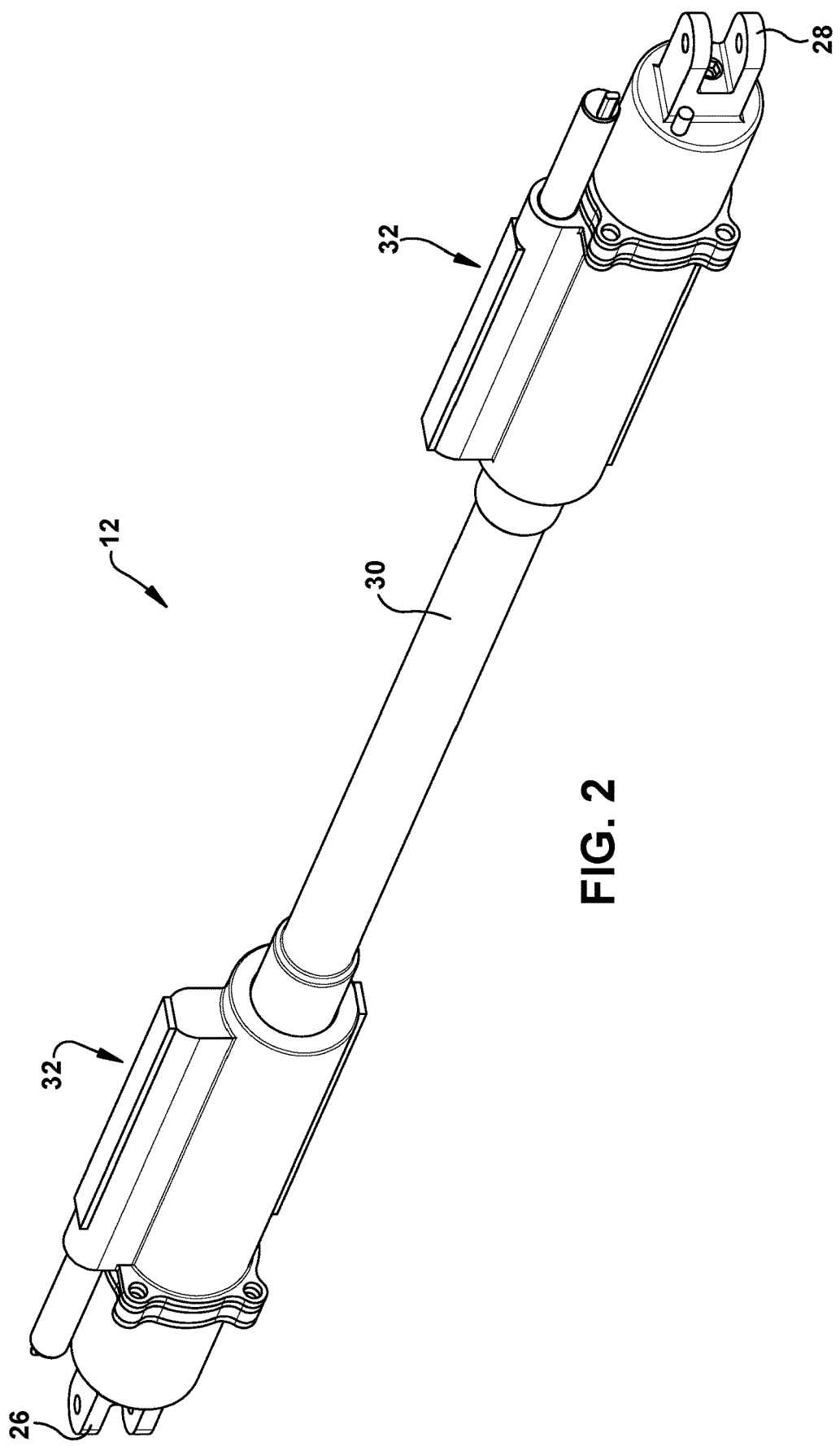
FIG. 2 is a perspective view of the control rod assembly.

Referring to FIG. 1, a helicopter rotor assembly 10 is shown having a plurality of exemplary control rod assemblies 12 that are in accordance with an embodiment of the present disclosure. Generally, the helicopter rotor assembly 10 provides the lift that allows the helicopter to fly, as well as the control that allows the helicopter to move laterally, make turns and change altitude. The rotor assembly 10 generally includes a rotor shaft 14 (or mast), a swash plate assembly 16, the exemplary control rod assemblies 12, a hub 18, and a plurality of rotor blades 20. To provide control and lift of the helicopter, the rotor assembly 10 adjusts the angle of the rotor blades 20 with each revolution they make. These adjustments may be communicated via the exemplary control rod assemblies 12 to the swash plate assembly 16, which in turn ultimately moves the control surfaces of the rotor blades 20.

For example, as shown in the illustrated embodiment, the swash plate assembly 16 includes an upper swash plate 16a and lower swash plate 16b. The upper swash plate 16a connects to the rotor shaft 14 through special linkages. As the engine turns the rotor shaft 14, the engine also turns the upper swash plate 16a and the rotor blade system. This system includes blade grips 22, which connect the rotor blades 20 to the hub 18. Pivot control rods from the upper swash plate 16a have a connection point on the blades or grips 22, which enable transfer movements of the upper swash plate 16a to the blades 20. The lower swash plate 16b is fixed, and ball bearings 24 are interposed between the upper and lower swash plates 16a, 16b, allowing the upper swash plate 16a to spin freely on top of the lower swash plate 16b.

The exemplary control rod assemblies 12 each includes a first connector 26 that may be coupled to the lower swash plate 16b, and an opposite second connector 28 (shown in FIGS. 2, 3 and 5-7) that may be coupled to another structure of the helicopter, such as the bulkhead or a part of a linkage assembly connected to pilot action. As described in further detail below, when inputs such as electrical signals are communicated to the control rod assembly 12, the control rod assembly 12 is operable to vary the distance between the respective connectors 26, 28, thereby effecting movement of the swashplate assembly 16 and thus the control surfaces of the rotor blades 20. The control rod assemblies 12 may be coupled to different portions of the swashplate assembly 16 to permit cyclic or collective control in a conventional manner. For example, with cyclic control, the control rod assemblies 12 may interact with the swashplate assembly 16 to change the angle of the blades individually as they revolve, which allows the helicopter to move in any direction about 360-degrees, including forward, backward, left and right. With collective control, the control rod assemblies 12 may interact with the swashplate assembly 16 to change the angle of all blades simultaneously, which allows the helicopter to gain or lose altitude.

Figure 5:
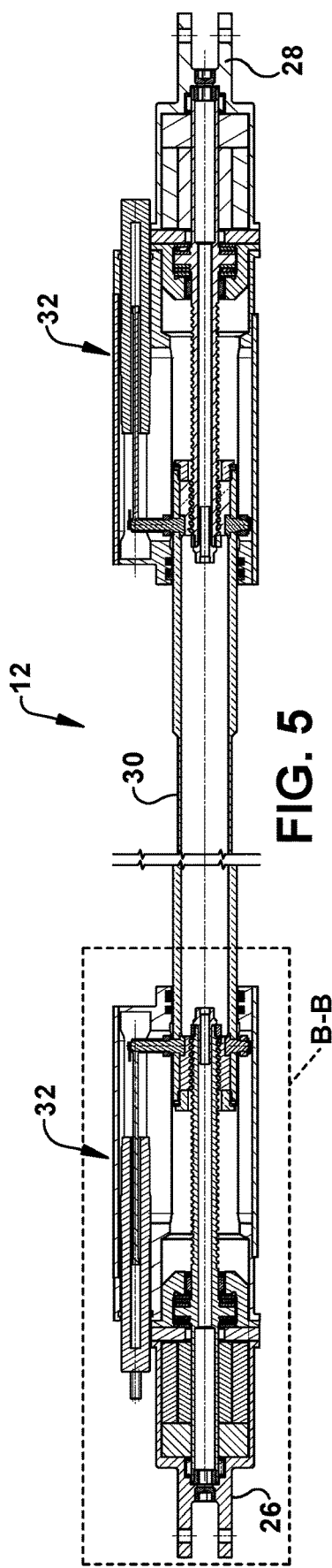
FIG. 5 is a cross-sectional side view of the control rod assembly taken about the line A-A in FIG. 4, in which the control rod assembly is shown in an exemplary fully-extended state.
Figure 6:
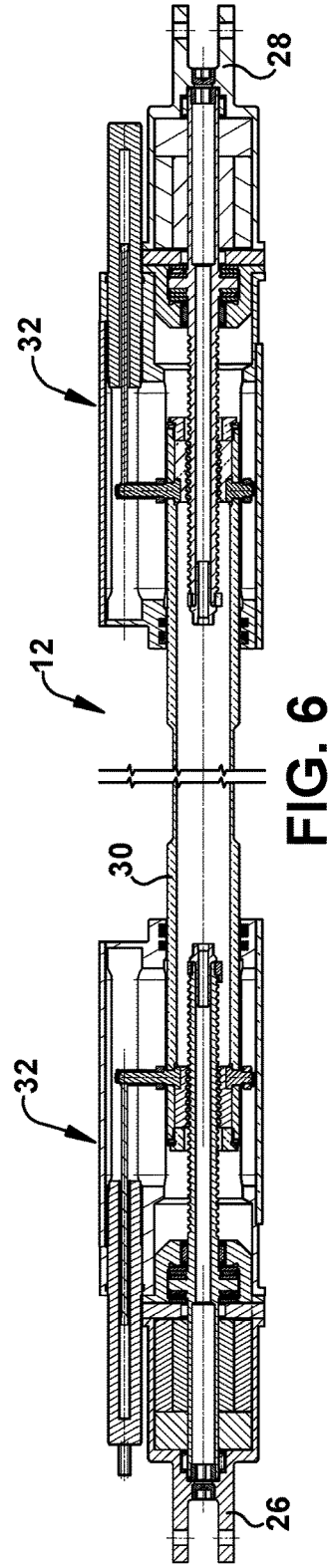
FIG. 6 is a cross-sectional side view of the control rod assembly taken about the line A-A in FIG. 4, in which the control rod assembly is shown in an exemplary partially-extended/partially-retracted (intermediate) state.
Figure 7:
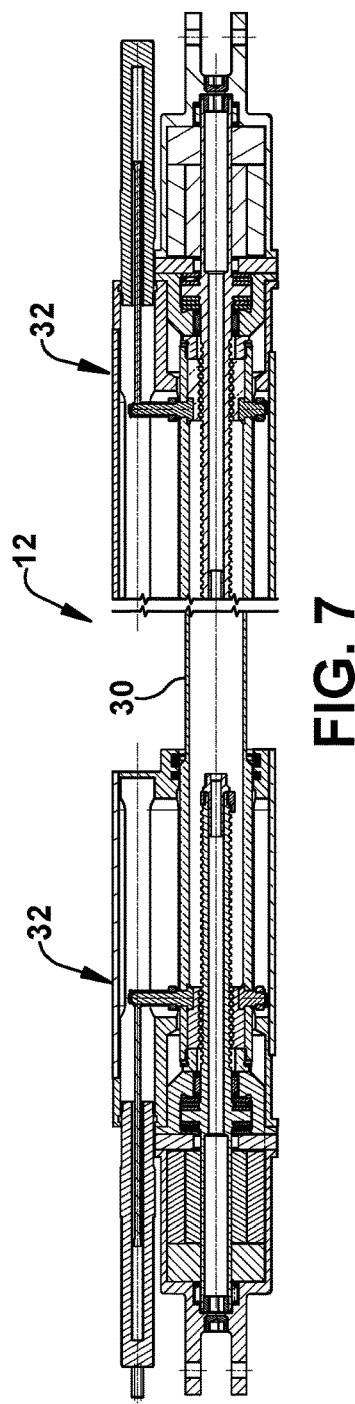
FIG. 7 is a cross-sectional side view of the control rod assembly taken about the line A-A in FIG. 4, in which the control rod assembly is shown in an exemplary fully-retracted state.

Referring to FIGS. 2-10, the exemplary control rod assembly 12 is shown in further detail. As shown, the control rod assembly 12 generally includes first and second connectors 26, 28, a connecting rod 30 operably coupled between the first and second connectors 26, 28, and at least one actuator 32 operably coupled to the connecting rod 30, in which the actuator(s) 32 are configured to adjust a position of the connecting rod 30 to vary a distance between the first and second connectors 26, 28 (e.g., the connector-to-connector length, also referred to as pin-to-pin length), as shown in FIGS. 5-7, for example.

In exemplary embodiments, the control rod assembly 12 includes two actuators 32 on opposite ends of the assembly 12 for effecting the change in distance between the connectors 26, 28. Such a configuration may provide redundancy in operating the control rod assembly 12. The control rod assembly 12 may be configured to operate in active/active mode (e.g., such that both actuators 32 are operated together to achieve the change in length between connectors 26, 28) or in active/standby mode (e.g., one actuator 32 can be operated while the other is in standby mode). As shown, the actuators 32 may be symmetrically positioned on the opposite ends of the assembly 12, which may help to reduce the effect of their mass on induced vibration. In the illustrated embodiment, each of the actuators 32 and the opposite sides of the connecting rod 30 are identically constructed, and thus only one of the actuators 32 will be described below for conciseness.

Generally, the actuator 32 may be any suitable actuator that enables adjustment of the connecting rod 30 to vary the distance between the first and second connectors 26, 28 of the control rod assembly 12. For example, the actuator 32 could be a rotary actuator, linear actuator, hydraulic actuator, electromechanical actuator, or the like. In preferred embodiments, the actuator 32 is an electromechanical (EM) actuator 32 that includes an electric motor 34 and a power screw mechanism 36 (e.g., screw-and-nut assembly 36) that is operably driven by the motor 34. The power screw mechanism 36 may include a ballscrew-and-ballnut assembly, an ACME screw, a roller screw, or any other suitable screw-and-nut assembly. The power screw mechanism 36 is operably coupled to the connecting rod 30, and when driven by the motor 34 is operative to extend or retract the connecting rod 30 relative to a portion of the actuator 32, and more particularly relative to the connector 26. The actuator 32 also may be able to irreversibly hold the connecting rod 30 in position, and is backed by failsafe features as will be described in further detail below.

Figure 8:
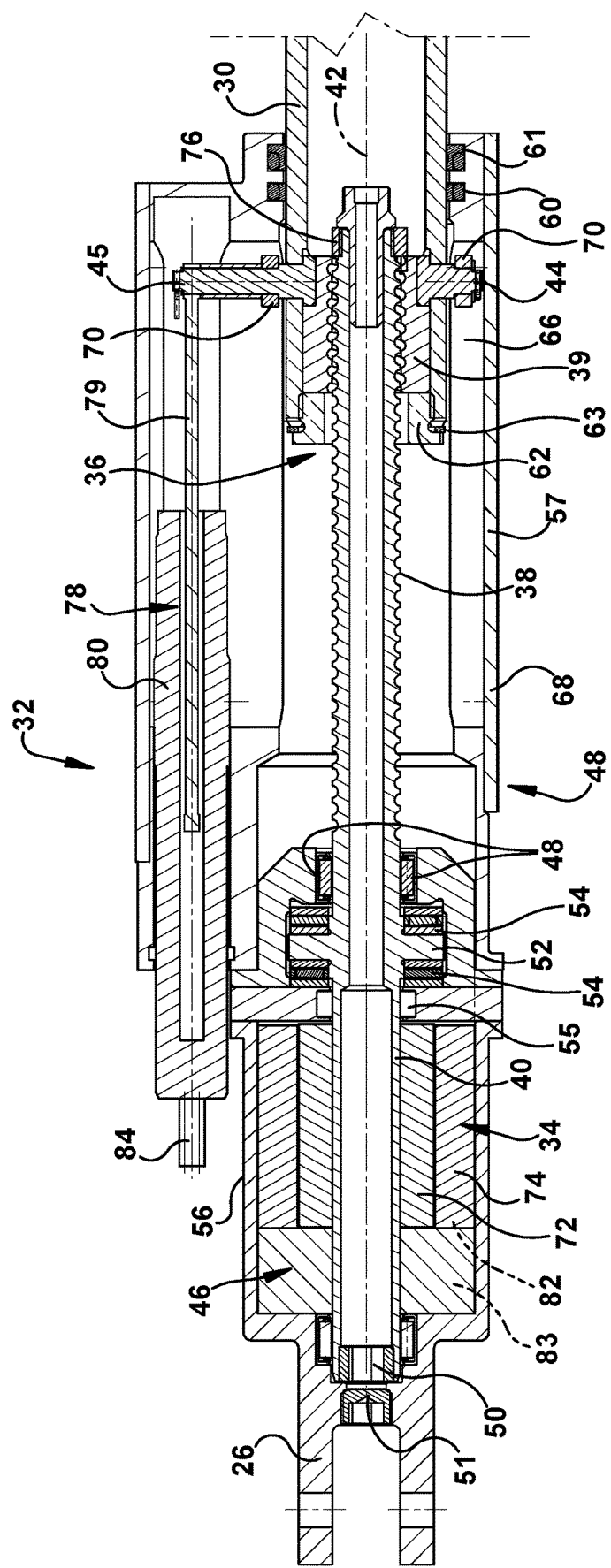
FIG. 8 is an enlarged cross-sectional side view taken from the region B-B in FIG. 5, which shows an exemplary actuator of the control rod assembly in further detail.

Referring particularly to FIGS. 8-10, the actuator 32 is shown in further detail. In exemplary embodiments, the power screw mechanism 36 of the actuator 32 is a ballscrew-and-ballnut assembly 36, including a ballscrew 38 and a ballnut 39. The ballscrew-and-ballnut assembly 36 is a mechanical linear actuator that translates rotational motion to linear motion with little friction and improved precision. A threaded shaft serves as the ballscrew 38 and provides a helical raceway for ball bearings contained within a ball assembly which serves as the ballnut 39. For example, in the illustrated embodiment, the ballscrew 38 may include a single-start thread design, and the ballnut 39 may include one or more independent circuits with an internal ball return configuration. The ballscrew-and-ballnut assembly 36 may enhance precision in the linear (axial) movements, such as by preloading the ball bearings in the ballnut 39 so that there is limited play between the ballscrew 38 and ballnut 39. Such a ballscrew-and-ballnut assembly 36 also may reduce or eliminate backlash that is otherwise more common in other power screw and nut combinations. In exemplary embodiments, the ballscrew 38 may be hollowed along a length thereof to minimize inertia, and the outer surface of the ballscrew 38 may be hardened to minimize wear.

In the illustrated embodiment, the motor 34 is configured to rotate the ballscrew 38 about a longitudinal axis 42, and the ballnut 39 includes anti-rotation features (such as a trunnion 44, described below) that restrict rotation of the ballnut 39 about the axis 42. In this manner, depending on the direction of rotation that the ballscrew 38 is driven by the motor 34, the ballnut 39 may translate linearly (e.g., left or right in the illustration) along the axis 42. In the illustrated embodiment, the ballnut 39 is operably coupled to an end portion of the connecting rod 30, and thus the linear translation of the ballnut 39 via driving of the ballscrew 38 will cause the connecting rod 30 to extend or retract with respect to a main portion of the actuator 32, and more particularly with respect to the connector 26. Such linear actuation provided by the actuator 32 thereby enables adjustment of the connecting rod 30 to vary the distance between the first and second connectors 26, 28.

In exemplary embodiments, the motor 34 is a direct drive motor 34 that drives the ballscrew-and-ballnut assembly 36. A direct drive motor is one that connects the load to the motor without mechanical transmission elements such as gearboxes, gear trains, or belt and pulley systems. In other words, a direct drive motor directly drives the load. In the illustrated embodiment, for example, the direct drive motor 34 includes an output shaft portion 40 that is integral and unitary with the ballscrew 38, which may minimize axial play in the mechanism and/or reduce mass. As shown, the output shaft portion 40 of the ballscrew 38 supports the motor 34 and a brake 46 (described below). It is understood, however, that the ballscrew 38 could be a separate component that is directly or indirectly connected to the output shaft portion 40 and still provide a direct driving connection between the ballscrew 38 and the motor 34 without mechanical transmission elements drivingly interposed therebetween. The output shaft portion 40 may be supported by two compact needle roller bearings 48, which may be spaced as far apart as possible to provide optimum moment support for lateral loads. An axial end of the output shaft 40 may include a drive interface 50 (e.g., hex socket) that is accessible during acceptance testing with removal of a threaded plug 51. The drive interface 50 also may provide access to the output shaft 40 during rigging or maintenance activities (e.g. EM brake holding torque check). The drive interface 50 also could be used for measuring friction and/or motor output torque. To achieve suitable support, the ballscrew 38 and/or output shaft 40 includes a flange portion 52 that is supported by two thrust bearings 54. These thrust bearings 54 are located adjacent to the motor 34 and may be greased with a suitable durable grease. A rotary dynamic seal 55 may be located outside of the motor 34, which provides sealing between the motor 34 and the greased thrust bearings 54 and ballscrew 38.

Although other suitable motors could be used, the use of direct drive motor 34 may minimize the envelope and weight of the actuator 32, which may be particularly beneficial for minimizing induced vibration in high-vibration environments such as helicopters. The direct drive motor 34 without a gear train also greatly improves the frequency response and thus performance. In addition, the direct drive motor 34 reduces or eliminates the "$N_2$" effect, which refers to the squaring effect of inertial load through a gear train. For example, a 65:1 gear train results in an increase in motor inertia reflected to the output as though it were driving an inertia of $65^2$, or 4,225 times greater. The direct drive motor 34 reduces or eliminates such effects. The lower mass of the actuator 32 provided by such motor 34 and/or other mass saving features also may minimize the moment of inertia on the assembly 12, which may improve lateral load capability of assembly 12. In addition, although other power screw assemblies could be used, the use of the ballscrew-and-ballnut assembly 36 may provide improved precision and accuracy, and may reduce friction and wear compared to other power screw designs. The power screw (e.g., ballscrew 38) may be the rotating component (as shown) or the translating component (e.g., cooperating with a rotation nut) depending on the design requirements. The exemplary design shown in the illustrated embodiment, however, minimizes the challenges involved in supporting a rotating nut, minimizes inertia, and enables the ballscrew 38 to be contained within a housing 48 to minimize exposure of the screw 38 to the external environment, for example.

As shown in the illustrated embodiment, the housing 48 forms an enclosure that may contain the various components of the actuator 32, including the motor 34, the brake 46, the ballscrew-and-ballnut assembly 36, etc. In the illustrated embodiment, the housing 48 includes a main housing portion 56 and a cover tube portion 57 that are coupled together via a flange 58 and fasteners. As shown, the main housing portion 48 includes the connector 26 at one end thereof (e.g., formed as a rod end at one end of the assembly 12). In the illustrated embodiment, the connector 26 is in the form of a clevis that will interface with lugs of the flight vehicle structure which may be fitted with spherical bearings, although other suitable connectors could be employed or could be attached to the housing in any suitable manner.

At the opposite end of the actuator 32, the cover tube portion 57 includes an opening through which the connecting rod 30 may extend or retract as the ballscrew 38 rotates and the ballnut 39 translates, as described above. In exemplary embodiments, the cover tube portion 57 may be a lubricated portion of the housing 48, and the main housing portion 56 may be a dry portion of the housing 48, and these portions may be separated by the rotary dynamic seal 55. As shown, the cover tube portion 57 may incorporate a glide ring 60 and an excluder 61 that interface with a radially outer surface of the connecting rod 30 to provide sealing of the inside of the cover tube portion 57 from the external environment. The glide ring 60 may include a polytetrafluorethylene (PTFE) sealing ring and an O-ring made of elastomer (e.g., NBR or FKM), for example. The excluder 61 may be a solid (rigid) ring with dual-scraper lip contact activated by an elastomeric O-ring. The primary lip of the excluder 61 may prevent dust, ice, and like contaminants from penetrating the system during the in-stroke of the connecting rod 30, and the secondary lip may restrict the lubrication from leaving the system during the out-stroke. Because the ballscrew-and-ballnut assembly 36 is enclosed inside the sealed housing 48, this minimizes the need for wiper seals and ice-scrapers for these components. This may help reduce motor size as there are fewer friction losses due to wiper drag. Such an approach also may contain the lubricant to within the housing 48, thereby minimizing maintenance activity.

In exemplary embodiments, the connecting rod 30 extends along the longitudinal axis 42 between the opposite actuators 32 of the control rod assembly 12, and is operably coupled at its opposite end portions to the nut (e.g., ballnut 39) of each actuator 32. In the illustrated embodiment, for example, the connecting rod 30 has openings at its opposite ends, and the ballnut 39 is disposed inside of a hollow end portion of the connecting rod 30. In this manner, as the ballscrew 38 is driven by the motor 34 and the ballnut 39 translates linearly, the extension or retraction of the connecting rod 30 relative to the actuator housing 48 will also cause the ballscrew 38 to extend or retract from the hollow end portion of the connecting rod 30. In exemplary embodiments, the ballnut 39 may include one or more stops (e.g., dog stops) (not shown) to prevent the ballscrew 38 from withdrawing from the ballnut 39. As shown, a retention nut 62 may be disposed at the end of the connecting rod 30, which may threadably cooperate with the ballscrew 38 and a locking device 63 (e.g., washer), to help retain the ballnut 39 within the connecting rod 30. In exemplary embodiments, the connecting rod 30 is formed as a hollow tube, which may minimize the mass and inertia of the control rod assembly 12. As shown, the connecting rod 30 may further include a reduced outer diameter portion 64 along its axial length to further reduce its mass. Alternatively, the central portion of the connecting rod 30 may include an increased outer diameter portion to improve stiffness-to-weight ratio. The connecting rod 30 may be made from any suitable material (e.g., metal) to withstand the conditions of the particular application, including side loading, stiffness, buckling capability, etc. The connecting rod 30 also may be made from a material, or include a surface coating material, that is suitable to interface with the glide ring 60 and excluder 61.

As discussed above, the nut (e.g., ballnut 39) includes anti-rotation features to restrict rotation as the nut linearly translates along the power screw (e.g., ballscrew 38). In exemplary embodiments, the housing 48 (e.g., cover tube portion 57) includes one or more slotted tracks 66 that cooperate with one or more trunnions 44, 45 extending from the ballnut 39 to provide such anti-rotation functionality the ballnut. As shown, the trunnions 44, 45 are coupled to the ballnut 39 and extend through radial openings in the connecting rod 30. As best shown in FIG. 10 (with a cover 68 of the housing 48 removed), the trunnions 44, 45 each include rollers 70 mounted thereon, which are configured to roll along the slotted tracks 66 of the cover tube portion 57.

In exemplary embodiments, the motor 34 is a brushless DC direct drive motor, although as mentioned above other suitable types of motors may be used, such as those with optimized low-speed and high-torque capability. As shown, the motor 34 is contained in the housing 48 (e.g., main housing portion 56) between the brake 46 and the ballscrew-and-ballnut assembly 36. Generally, the motor 34 and brake are the heavier components of the actuator 32, and thus may be placed at the ends of the control rod assembly 12 to minimize their impact on induced vibration. As discussed above, to reduce inertia and weight, reduce failure modes/parts count, enhance the ballscrew 38 support against lateral loads, and the like, the motor 34 is a direct drive motor having a single shaft in which the output shaft portion 40 on one side of the shaft interfaces with the motor 34 and brake 46, and the ballscrew threads on an opposite side of the shaft provide the ballscrew 38 that interfaces with the ballnut 39.

Generally, the motor 34 includes a stator assembly 72, a rotor assembly 74, a position sensor (e.g., resolver) (hidden from view), and a motor electronic control unit (MCU) 75 (depicted schematically in FIG. 1). In exemplary embodiments, the motor 34 may be a three-phase, sinusoidal communicated, permanent magnet brushless motor. The MCU 75 may provide the motor 34 with three-phase pulse-width-modulated direct current voltage which results in sinusoidal phase currents. The MCU 75 can be packaged within the control rod assembly 12, or may be remotely mounted away from the control rod assembly and connected to the actuator 32 via an electric wiring harness. The rotor assembly 74 may include strong permanent magnets, such as neodymium-based ring magnets, which may be mounted to the output shaft portion 40, such as with a high-strength adhesive. In the illustrated embodiment, the magnets of the rotor assembly 74 rotate radially inward of the stator assembly 72. The stator assembly 72 may include a lamination stack and electrical windings, which may be impregnated and over-molded with a suitable material in a manner well-known in the art. The feedback for motor commutation and servo control is provided by the position sensor (e.g., resolver). The position sensor will provide continuous rotor position feedback signals to the MCU 75 for rotor position monitoring and proper phase commutation. In the illustrated embodiment, the position sensor (e.g., resolver) is mounted within the main housing portion 56 and integrated with the motor 34, and preferably is compact and lightweight to minimize mass and inertia on the control rod assembly 12. Other forms of position sensing/commutation could be provided, such as back EMF signal or hall effect sensors.

In exemplary embodiments, the control rod assembly 12 includes mechanical and electrical stops for holding the position of the connecting rod 30 relative to the actuator 32, or for preventing such relative movement beyond a certain position. In the illustrated embodiment, for example, a stop 76, such as a mechanical dog stop, is provided at an end portion (extend end) of the ballscrew 38. Such a stop 76 will prevent the connecting rod 30 from being extracted from the actuator 32 when moved toward the extend position. As discussed above, in exemplary embodiments, the ballnut 39 may include a stop (e.g., dog stop) (not shown) to prevent the ballscrew 38 from withdrawing from the ballnut 39. A dog stop may be advantageous because such a stop generally will react only to ballscrew torque (which is relatively small), whereas other forms of stops may react to high axial loads. The dog stop may be a compliant design to absorb kinetic energy of the system. In exemplary embodiments, the position of the mechanical stops may be adjustable to permit shorter or longer stroke of the connecting rod 30 as may be desired for the particular application.

The electrical stop(s) for actuator 32 may include the use of position monitoring of a main portion of the actuator 32 (e.g., housing 48) relative to the connecting rod 30 via at least one position sensor 78. In the illustrated embodiment, the position sensor 78 is a linear variable differential transducer (LVDT). Each actuator 32 may include such an LVDT 78 that provides ratiometric output that corresponds to the connector 26 to connector 28 position. Generally, the actuator 32 may be configured to extend, retract or hold (via motor zero velocity) the connecting rod 30 in position relative to the actuator 32 by monitoring signals corresponding to the position that are received from the sensor 78 (e.g. LVDT). Based upon such positional information, the actuator 32 may be configured to provide an electrical stop (motor zero velocity) to hold the connecting rod 30 if a particular position is reached during the extend or retract. An adequate distance may be maintained between the electrical stop and the mechanical stop to account for any inaccuracies in the LVDT; or account for other sources of error such as overshoot, controller error and assembly manufacturing tolerances.

As shown, the LVDT 78 may be contained in the housing 48, such as having a movable plunger portion 79 at least partially contained by the cover tube portion 57, and a fixed tube portion 80 of the LVDT forming another portion of the housing 48. As shown, the movable plunger portion 79 of the LVDT may be connected to the trunnion 45 of the ballnut 39. In this manner, as the ballnut 39 translates, the LVDT plunger 79 also will translate to measure and report the travel. Although the use of an LVDT position sensor offers a cost effective and direct travel measurement solution, such a design may add to the envelop of the actuator 32. It is understood that other suitable position sensors 78 may be used alternatively or additionally to the LVDT, such as a rotary variable differential transformer (RVDT), or a resolver with reduction gear head, or a multi-channel sensor for redundancy.

The brake 46 provides a failsafe design to statically hold the connecting rod 30 in position relative to the actuator 32. As discussed above, the brake 46 may be integrated within the housing 48 (e.g., main housing portion 56) behind the motor 34 and resolver. In the illustrated embodiment, the brake 46 is an electromechanical brake which provides the failsafe design. For example, the electromechanical brake 46 may include a solenoid coil, armature with friction pad rings for engaging the output shaft 40, compression springs and a dynamic disc. When the solenoid is energized (e.g., power received), the brake 46 is disengaged such that the armature will be pulled to overcome the compression springs and create a gap between the friction pads and the dynamic disc, thereby allowing the dynamic disc connected (splined) to the shaft 40 to be free rotate. When the brake solenoid is electrically de-energized (e.g., power reduction or loss), the brake 46 is mechanically engaged, such that the friction pads engage and statically hold the dynamic disc connected to the shaft 40, thereby preventing rotation. Generally, the brake 46 is designed and sized to provide a suitable static hold torque for the system design and to withstand maximum axial load experienced by the actuator 32.

In exemplary embodiments, the actuator 32 includes electrical wiring and/or one or more connectors for powering and/or communicating with components of the actuator 32, such as a connector(s) 82 for the motor 34 and/or resolver, a connector 83 for the brake 46, and a connector 84 for the position sensor 78. Additional wiring and/or connectors may be provided for other electronics provided with the actuator 32, such as the onboard electronic motor control unit 75 if one is provided in the actuator 32. The electrical connector(s) may be integrated into the housing 48 (e.g., main housing portion 56) to interface with an electrical harness of the flight vehicle, such as by providing the housing 48 with a boss and threaded hole to interface with electric bonding jumper, for example. Alternatively or additionally, the actuator 32 could include electrical pigtail(s) with electrical connector(s) at their respective ends. Generally, any suitable electrical communication path may be provided for powering and/or communicating with the actuator(s) 32.

In exemplary embodiments, the control rod assembly 12 can be controlled by a flight computer 85 (FIG. 1) of the flight vehicle instead of pilot action by communicating and receiving signals between the flight computer and the actuator(s) 32. For example, information from the position sensor 78 about the position of the actuator 32 relative to the connecting rod 30 may be communicated to the motor electronic control unit (MCU) 75 and/or the flight computer 85 for position feedback information. Likewise, other sensor(s) may be provided to communicate information about current, velocity, load, etc. The actuator 32, and in particular the motor 34, may be commanded based upon the feedback information from the MCU 75 and/or flight computer 85. Each actuator 32 may be commanded and monitored by a dedicated MCU channel. As discussed above, the MCU 75 for each actuator 32 may be packaged within the control rod assembly 12 (e.g., within the housing 48). Alternatively, the MCU(s) 75 may be remotely mounted away from the control rod assembly 12 (e.g., as a module that is part of, or separate from, the flight computer 85) and connected to the actuator 32 via an electric wiring harness, for example. It is understood that although the control rod assembly 12 may reduce or eliminate pilot action, the control rod assembly 12 may be used in conjunction with pilot action. For example, the control rod assembly 12 may be held in a static (hold) position when pilot input is used to move the control surfaces via the control rod assembly 12 in a more conventional manner; or the MCU(s) 75 of the control rod assembly 12 may interpret pilot input and provide a control signal to cause extending, retracting or holding action of the assembly 12 to move the control surfaces in accordance with the pilot input (e.g., pilot augmentation).

An exemplary control rod assembly has been described herein for moving a control surface of a flight vehicle. The control rod assembly includes a first connector for connecting to a first structure of vehicle, and a second connector for connecting to a second structure of the vehicle. A connecting rod may be operably coupled between the first and second connectors, and an actuator may be operably coupled to the connecting rod. The actuator may include a screw-and-nut assembly, and a motor that is configured to drive the screw-and-nut assembly. The actuator may be operable such that driving the screw-and-nut assembly via the motor causes the connecting rod to translate linearly along a longitudinal axis to thereby vary a distance between the first and second connectors. The actuators may be electromechanical actuators which may be controlled by a controller without pilot interaction. Two such actuators may be provided on opposite sides of the assembly.

More generally, a smart control rod assembly has been disclosed herein which can be controlled by electronic controllers, with or without pilot action.

The smart control rod described herein can enable interchanging a fixed length conventional mechanical control rod with a smart control rod that is actuated via electromechanical (EM) actuators.

The smart control rod may include a pair of inline direct motor drives, with one motor on either end to vary the length of the rod. The direct motor drives can each constructed to have a rotating ballscrew, a translating ballnut, and a failsafe electromechanical brake and position sensing. The system could be configured to operate in active/active mode or in active/standby mode (e.g., such that both motors are operated together to achieve the change in length, or one motor can be operated while the other is in standby mode). The smart control rod may be designed with irreversible functionality, thereby fulfilling the conventional design and containing an electromechanical actuator per side that enables change in connector-to-connector length. When driven, the actuator allows the control connector-to-connector length to vary as desired (expanding or retracting) mimicking the pilot action. The electromechanical actuator may include a motor, a brake, a position sensor and a power screw (ball screw, ACME screw or roller screw). The power screw may be rotating or translating depending on the packaging. Each actuator per smart control rod may be commanded and monitored by a dedicated motor control unit channel. The control unit electronics can be packaged within the actuator or remotely mounted away from the actuator and connected to the actuator via an electric wiring harness.

According to an aspect, a smart control rod is disclosed herein that may offer a compact, environmentally sealed, symmetric packaging, low axial play, stiff, irreversible, and/or low maintenance design solution. The control rod also provides a lightweight/low inertia solution suitable for high vibratory environment.

Generally, each EM actuator can contain the following components: an enclosure/housing that contains the components; fail-safe fixed, electromechanical brake; motor assembly; power screw assembly with anti-rotation trunnion on the ballnut; various thrust and ball bearings; various seals and gaskets; and a position sensing assembly.

According to an aspect, an exemplary control rod is disclosed herein having a unique physical assembly with symmetrically opposing actuators connected to a common rod. The actuators may be direct drive systems to reduce or eliminate reflected inertia through the gear train. The combined effect of the actuators strategically placed at the ends, combined with low weight and low reflected inertia provides an advantageous design according to an aspect of the present disclosure.

According to an aspect, a control rod assembly for moving a control surface of a flight vehicle includes: a first connector for connecting to a first structure of the flight vehicle; a second connector for connecting to a second structure of the flight vehicle; a connecting rod operably coupled between the first and second connectors; and an actuator operably coupled to the connecting rod, the actuator including a screw-and-nut assembly mounted with respect to the connecting rod, and a motor that is configured to drive the screw-and-nut assembly; wherein the actuator is operable such that driving the screw-and-nut assembly via the motor causes the connecting rod to translate linearly along a longitudinal axis to thereby vary a distance between the first and second connectors.

Embodiments may include one or more of the following additional features, separately or in any combination.

In some embodiments, the motor and screw-and-nut assembly are contained within a housing of the actuator.

In some embodiments, the connecting rod is linearly movable relative to the housing along the longitudinal axis.

In some embodiments, the housing includes an opening at a first end portion thereof that receives an end portion of the connecting rod, the connecting rod being extendable or retractable with respect of the housing via the opening.

In some embodiments, the housing includes the first connector at a second end portion thereof that is opposite the first end portion.

In some embodiments, the motor is a direct drive electric motor that is operable to drive the screw-and-nut assembly without the use of mechanical transmission elements such as gear trains.

In some embodiments, the nut-and-screw assembly is a ballscrew-and-ballnut assembly including a ballscrew and a ballnut.

In some embodiments, the ballscrew is rotatably drivable by the motor.

In some embodiments, the ballnut is linearly translatable along the ballscrew, the ballnut being operatively coupled to the connecting rod such that driving the ball screw via the motor causes the connecting rod to linearly translate with the ball nut.

In some embodiments, the motor is a brushless DC direct drive motor.

In some embodiments, an output shaft of the motor is unitary with the ballscrew.

In some embodiments, the actuator includes an electromechanical brake including a solenoid and a brake mechanism configured to permit or restrict rotation of an output shaft of the motor; wherein, when the solenoid is energized, the electromechanical brake is in a disengaged state such that the brake mechanism permits rotation of the output shaft; and wherein, when the solenoid is de-energized, the electromechanical brake is in an engaged state such that the brake mechanism restricts rotation of the output shaft.

In some embodiments, the actuator includes a position sensor for sensing a position of a portion of the connecting rod relative to a portion of the actuator.

In some embodiments, the actuator includes an electronic controller configured to control the motor.

In some embodiments, the electronic controller is mounted onboard the control rod assembly, or wherein the electronic controller is located remotely of the control rod assembly.

In some embodiments, the control rod assembly further includes one or more stops for holding a position of the connecting rod relative to the first or second connector.

In some embodiments, the one or more stops include one or more mechanical stops or one or more electrical stops.

In some embodiments, the actuator is a first actuator disposed at a first end portion of the control rod assembly.

In some embodiments, the control rod assembly includes a second actuator disposed at a second end portion of the control rod assembly opposite the first end portion.

In some embodiments, the screw-and-nut assembly includes a power screw and a nut, the nut being operably coupled within a hollow internal portion of the connecting rod, the power screw being rotatable and the nut being translatable, and wherein the power screw is extendible or retractable relative to the hollow internal portion via the nut.

In some embodiments, the screw-and-nut assembly includes a power screw and a nut, the nut being operably coupled to the connecting rod, the power screw being rotatable and the nut being translatable, and wherein the nut includes an anti-rotation trunnion having a roller that is guideably movable in a groove of the housing of the actuator.

In some embodiments, the first end portion of the housing of the actuator includes a seal and/or a scraper.

According to another aspect, a control rod assembly includes: a connecting rod, a first end portion having a first actuator that is operably coupled to the connecting rod and operative to extend, retract, or hold a first portion of the connecting rod relative to the first actuator, a second end portion opposite the first end portion having a second actuator that is operably coupled to the connecting rod and operative to extend, retract, or hold a second portion of the connecting rod relative to the second actuator.

Embodiments may include one or more of the following additional features, separately or in any combination.

In some embodiments, the first and second actuators are electromechanical actuators that each include an electric motor, a ballscrew, and a ballnut.

In some embodiments, the ballscrew is operably coupled to the electric motor for being rotated about an axis by the electric motor.

In some embodiments, the ballnut is operably coupled to the connecting rod for common axial movement together.

In some embodiments, the ballscrew and connecting rod are linearly translatable in a direction of the axis in response to rotation of the ballscrew via the electric motor.

In some embodiments, the control rod may include a first position sensor and/or the second actuator comprises a second actuator.

In some embodiments, the first actuator includes a first translating ballnut and/or the second actuator includes a second translating ballnut.

In some embodiments, the first actuator includes a first electromechanical brake and/or the second actuator includes a second electromechanical brake.

In some embodiments, the one actuator includes a position sensing assembly to monitor change in control rod length and/or the second actuator includes a second position sensing assembly.

In some embodiments, the actuator enclosure includes a main housing and a cover tube, which can be bolted together. The main housing contains an interface to the actuator of a flight vehicle structure. The interface may be a clevis that will interface with lugs fitted with spherical bearings or a different suitable interface. The screw portion of the ballscrew may be extended into an integrated shaft which also supports a motor and brake.

In some embodiments, a tube cover assembly is bolted to the main housing. The cover tube includes two slotted tracks that will be used to anti-rotate the ballnut. The cover tube incorporates rotary seal that interfaces with the connecting tube outer diameters providing sealing. As the ballscrew rotates, the ballnut will translate and actuate the connecting rod in the desired direction of extending or retracting it. The ballnut can be anti-rotated by two rollers mounted to ballnut trunnion rolling along two tracks integrated into the tube cover.

In some embodiments, the connecting rod is located between the two EM actuators, and is connected to the ball nut of each EM actuator.

In some embodiments, the ballscrew assembly includes a ballscrew, ballnut, and balls and limiting mechanical stops. Multiple thrust bearing and ball bearings are used to provide support to rotating components.

In some embodiments, the system includes a fail-safe solenoid energized EM brake.

In some embodiments, the position sensor used to monitor each EMA linear travel can be a LVDT (Linear Variable Differential Transducer). Each EM actuator can include a LVDT that provides ratiometric output that correspond to a SCAS pin to pin position $R=(Va-Vb)/(Va+Vb)$ (definition of ratiometric output). The LVDT can be housed in the cover tube assembly, in which one end is fixed and the other end is connected to the ballnut trunnion. As the ballnut translates the LVDT will measure and report the travel.

According to another aspect, a flight vehicle includes the control rod assembly according to any of the foregoing.

In exemplary embodiments, the first connector is connected to a first structure of the flight vehicle, such as a crank or portion having a control surface (e.g., elevators, ailerons, rudders, stabilizers, flaps, slats, spoilers, or the like), and the second connector is connected to a second (e.g., fixed (structure of the flight vehicle, such as a portion of the fuselage.

According to another aspect, a helicopter rotor assembly includes: a plurality of rotor blades having respective control surfaces; a swashplate assembly operably coupled to the plurality of blades; a control rod assembly operably coupled to the swashplate assembly to effect movement of the control surfaces; wherein the control rod assembly includes: a first connector operably coupled to the swashplate, and second connector operably coupled to another structure of the helicopter; a connecting rod operably coupled between the first and second connectors; and an actuator operably coupled to the connecting rod, the actuator being configured to adjust a position of the connecting rod to vary a distance between the first and second connectors.

According to another aspect, a helicopter includes the rotor assembly according to the foregoing.

According to another aspect, a flight vehicle control system of a flight vehicle having a control surface includes: an electronic flight controller; and the control rod assembly according to any of the foregoing that is operably coupled to the flight controller; wherein the control rod assembly is operable to move the control surface of the flight vehicle independently of human pilot interaction.

It is understood that embodiments of the subject matter described in this disclosure can be implemented in combination with digital electronic circuitry, controllers, processors, computer software, firmware, and/or hardware. For example, embodiments may be implemented control rod assembly and/or flight control system that uses one or more modules of computer program with instructions encoded on a non-transitory computer-readable medium for execution by, or to control the operation of, data processing apparatus. The operations may include physical manipulations of physical quantities. Usually, though not necessarily, the physical quantities take the form of electrical or magnetic signals capable of being stored, transferred, combined, compared, and otherwise manipulated in a logic and the like.

It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of the foregoing. The controller may include all apparatus, devices, and machines for processing data, including by way of example a programmable processor, a computer, or multiple processors or computers.

The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random-access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

An "operable connection," or a connection by which entities are "operably connected," also may be one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

It is understood that terms such as "top," "bottom," "upper," "lower," "left," "right," "front," "rear," "forward," "rearward," and the like as used herein may refer to an arbitrary frame of reference, rather than to the ordinary gravitational frame of reference.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flight vehicle control rod assembly for moving a control surface of a flight vehicle, comprising:
    a first connector for connecting to a first structure of the flight vehicle;
    a second connector for connecting to a second structure of the flight vehicle;
    a connecting rod operably coupled between the first and second connectors; and
    an actuator operably coupled to the connecting rod, the actuator including a screw-and-nut assembly mounted with respect to the connecting rod, and a motor that is configured to drive the screw-and-nut assembly;
    wherein the actuator is operable such that driving the screw-and-nut assembly via the motor causes the connecting rod to translate linearly along a longitudinal axis to thereby vary a distance between the first and second connectors.

2. The flight vehicle control rod assembly according to claim 1,
    wherein the motor and screw-and-nut assembly are contained within a housing of the actuator; and
    wherein the connecting rod is linearly movable relative to the housing along the longitudinal axis.

3. The flight vehicle control rod assembly according to claim 1,
    wherein the housing includes an opening at a first end portion thereof that receives an end portion of the connecting rod, the connecting rod being extendable or retractable with respect of the housing via the opening; and
    wherein the housing includes the first connector at a second end portion thereof that is opposite the first end portion.

4. The flight vehicle control rod assembly according to claim 1,
    wherein the motor is a direct drive electric motor that is operable to drive the screw-and-nut assembly.

5. The flight vehicle control rod assembly according to claim 1,
    wherein the nut-and-screw assembly is a ballscrew-and-ballnut assembly including a ballscrew and a ballnut;
    wherein the ballscrew is rotatably drivable by the motor; and
    wherein the ballnut is linearly translatable along the ballscrew, the ballnut being operatively coupled to the connecting rod such that driving the ball screw via the motor causes the connecting rod to linearly translate with the ball nut.

6. The flight vehicle control rod assembly according to claim 5, wherein the motor is a brushless DC direct drive motor, and wherein an output shaft of the motor is unitary with the ballscrew.

7. The flight vehicle control rod assembly according to claim 1,
    wherein the actuator includes an electromechanical brake including a solenoid and a brake mechanism configured to permit or restrict rotation of an output shaft of the motor;
    wherein, when the solenoid is energized, the electromechanical brake is in a disengaged state such that the brake mechanism permits rotation of the output shaft; and
    wherein, when the solenoid is de-energized, the electromechanical brake is in an engaged state such that the brake mechanism restricts rotation of the output shaft.

8. The flight vehicle control rod assembly according to claim 1, wherein the actuator includes a position sensor for sensing a position of a portion of the connecting rod relative to a portion of the actuator.

9. The flight vehicle control rod assembly according to claim 1, wherein the actuator includes an electronic controller configured to control the motor.

10. The flight vehicle control rod assembly according to claim 9, wherein the electronic controller is mounted onboard the control rod assembly, or wherein the electronic controller is located remotely of the control rod assembly.

11. The flight vehicle control rod assembly according to claim 1, further comprising one or more stops for holding a position of the connecting rod relative to the first or second connector.

12. The flight vehicle control rod assembly according to claim 11,
    wherein the one or more stops include one or more mechanical stops or one or more electrical stops.

13. The flight vehicle control rod assembly according to claim 1,
    wherein the actuator is a first actuator disposed at a first end portion of the control rod assembly; and
    wherein the control rod assembly includes a second actuator disposed at a second end portion of the control rod assembly opposite the first end portion.

14. The flight vehicle control rod assembly according to claim 1,
    wherein the screw-and-nut assembly includes a power screw and a nut, the nut being operably coupled within a hollow internal portion of the connecting rod, the power screw being rotatable and the nut being translatable, and wherein the power screw is extendible or retractable relative to the hollow internal portion via the nut.

15. The flight vehicle control rod assembly according to claim 2, wherein the screw-and-nut assembly includes a power screw and a nut, the nut being operably coupled to the connecting rod, the power screw being rotatable and the nut being translatable, and wherein the nut includes an anti-rotation trunnion having a roller that is guidably movable in a groove of the housing of the actuator.

16. The flight vehicle control rod assembly according to claim 3, wherein the first end portion of the housing of the actuator includes a seal and/or a scraper.

17. A flight vehicle control rod assembly comprising:
    a connecting rod,
    a first end portion having a first actuator that is operably coupled to the connecting rod and operative to extend, retract, or hold a first portion of the connecting rod relative to the first actuator,
    a second end portion opposite the first end portion having a second actuator that is operably coupled to the connecting rod and operative to extend, retract, or hold a second portion of the connecting rod relative to the second actuator, wherein the first and second actuators are electromechanical actuators that each include an electric motor, a ballscrew, and a ballnut;
wherein the ballscrew is operably coupled to the electric motor for being rotated about an axis by the electric motor;
wherein the ballnut is operably coupled to the connecting rod for common axial movement together; and
wherein the ballscrew and connecting rod are linearly translatable in a direction of the axis in response to rotation of the ballscrew via the electric motor.

18. A rotor assembly of a helicopter, comprising:
a plurality of rotor blades having respective control surfaces;
a swashplate assembly operably coupled to the plurality of blades;
a control rod assembly operably coupled to the swashplate assembly to effect movement of the control surfaces;
wherein the control rod assembly includes:
a first connector operably coupled to the swashplate, and a second connector operably coupled to another structure of the helicopter;
a connecting rod operably coupled between the first and second connectors; and
an actuator operably coupled to the connecting rod, the actuator being configured to adjust a position of the connecting rod to vary a distance between the first and second connectors.

19. A flight vehicle control system of a flight vehicle having a control surface, the flight vehicle control system comprising:
an electronic flight controller; and
the control rod assembly according to claim 1, operably coupled to the flight controller;
wherein the control rod assembly is operable to move the control surface of the flight vehicle independently of human pilot interaction.

* * * * *